US012649468B2

(12) United States Patent
Hollowell et al.

(10) Patent No.: US 12,649,468 B2
(45) Date of Patent: Jun. 9, 2026

(54) SYSTEM AND METHOD FOR OPERATING AUTONOMOUS CRUISE CONTROL IN LOWERED TRACTION AND VISIBILITY MODE

(71) Applicant: FCA US LLC, Auburn Hills, MI (US)

(72) Inventors: James R Hollowell, Auburn Hills, MI (US); Zachary C Rogalski, II, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 36 days.

(21) Appl. No.: 18/755,778

(22) Filed: Jun. 27, 2024

(65) Prior Publication Data

US 2026/0001541 A1     Jan. 1, 2026

(51) Int. Cl.
B60W 30/16          (2020.01)
B60W 50/16          (2020.01)

(52) U.S. Cl.
CPC ............ B60W 30/16 (2013.01); B60W 50/16 (2013.01); B60W 2520/28 (2013.01); B60W 2530/20 (2013.01); B60W 2555/20 (2020.02); B60W 2710/18 (2013.01); B60W 2720/106 (2013.01); B60W 2754/30 (2020.02)

(58) Field of Classification Search
CPC .. B60W 30/16; B60W 50/16; B60W 2520/28; B60W 2530/20; B60W 2555/20; B60W 2710/18; B60W 2720/106; B60W 2754/30
See application file for complete search history.

(56) References Cited

U.S. PATENT DOCUMENTS

| | | | | |
|---|---|---|---|---|
| 10,089,694 B1 * | 10/2018 | Biemer | ................. | G06Q 40/08 |
| 2009/0072997 A1 * | 3/2009 | Shrum, Jr. | ............. | G08G 1/127 |
| | | | | 340/905 |
| 2014/0244123 A1 * | 8/2014 | Matsunaga | ............. | B60T 8/172 |
| | | | | 701/67 |
| 2016/0075332 A1 * | 3/2016 | Edo-Ros | ........... | B60W 30/0956 |
| | | | | 701/70 |
| 2019/0308617 A1 * | 10/2019 | Groult | .................... | B60Q 1/543 |
| 2022/0185293 A1 * | 6/2022 | Choi | ..................... | B60W 10/18 |
| 2022/0203891 A1 * | 6/2022 | Hong | ..................... | B60Q 9/008 |
| 2024/0300481 A1 * | 9/2024 | Sivakumar | .......... | B60W 40/064 |

* cited by examiner

*Primary Examiner* — Jason Holloway
*Assistant Examiner* — Madison B Emmett
(74) *Attorney, Agent, or Firm* — Jeremy J. Klobucar

(57)          ABSTRACT

An autonomous cruise control (ACC) system that implements a corrective action strategy based on driving conditions for a vehicle is provided. The ACC system includes a drive unit, vehicle sensors and a controller. The controller: receives at least signal from at least one vehicle sensor indicative of a driving condition; determines, based on the signal, whether the at least one signal satisfies a threshold indicative of an unsafe driving condition; and performs the corrective action strategy based on the determination that at least one signal satisfies an unsafe driving condition. The corrective action strategy comprises at least one of: (i) increasing a preset distance to a target vehicle; (ii) communicating a message to a human machine interface indicative of an unsafe driving condition; (iii) communicating a signal to vehicle brakes to initiate a braking event; and (iv) communicating a signal to a traction control system to alter an acceleration setting.

18 Claims, 3 Drawing Sheets

SYSTEM AND METHOD FOR OPERATING AUTONOMOUS CRUISE CONTROL IN LOWERED TRACTION AND VISIBILITY MODE

FIELD

The present disclosure relates generally to a system and method for operating autonomous cruise control in a lowered traction and visibility mode.

BACKGROUND

Autonomous or adaptive cruise control (ACC), automatically reduces the vehicle's speed when a slower vehicle appears in the lane ahead to ensure that the cruise controlled vehicle is at a safe following distance. The ACC system will accelerate the vehicle back to its set cruise control speed when the lane becomes free or the distance between the two vehicles increases to the safe following distance. An ACC system with a stop and go feature will apply the vehicle's brakes until the vehicle comes to a stop (if necessary) before allowing the vehicle to go off again when the traffic ahead moves. Most ACC systems work on the assumption that normal driving conditions exist. However, not all driving conditions are ideal. As such, operating an ACC system assuming the driving conditions are different than they actually are can be undesirable. Thus, there remains a need for improvement in the relevant art.

SUMMARY

In one example aspect, an autonomous cruise control (ACC) system that implements a corrective action strategy based on driving conditions for a vehicle is provided. The ACC system includes a drive unit, vehicle sensors and a controller. The drive unit provides drive torque to at least one wheel of the vehicle wheels for propelling the vehicle. The vehicle sensors sense vehicle driving conditions. The controller implements the corrective action strategy. The controller: receives at least signal from at least one vehicle sensor indicative of a driving condition; determines, based on the signal, whether the at least one signal satisfies a threshold indicative of an unsafe driving condition; and performs the corrective action strategy based on the determination that at least one signal satisfies an unsafe driving condition. The corrective action strategy comprises at least one of: (i) increasing a preset distance to a target vehicle; (ii) communicating a message to a human machine interface (HMI) in the vehicle indicative of an unsafe driving condition; (iii) communicating a signal to vehicle brakes of the vehicle to initiate a braking event; and (iv) communicating a signal to a traction control system to alter an acceleration setting.

In another aspect, the vehicle sensors comprise an ambient temperature sensor that communicates a temperature signal to the controller, and wherein the controller determines whether an unsafe driving condition exists based on comparing the temperature signal to a threshold temperature.

In some implementations, the vehicle sensors comprise a tire pressure sensor that communicates a tire pressure signal to the controller, and wherein the controller determines whether an unsafe driving condition exists based on comparing the tire pressure signal to a threshold tire pressure.

In some implementations, the vehicle sensors comprise a windshield wiper sensor that communicates a windshield wiper signal to the controller, and wherein the controller determines whether an unsafe driving condition exists based on the windshield wiper signal.

In some configurations, the vehicle sensors comprise a headlight sensor that communicates a headlight sensor signal to the controller, and wherein the controller determines whether an unsafe driving condition exists based on the headlight sensor signal.

In additional features, the vehicle sensors comprise one of a haptic lane and driver assist sensor that communicates a haptic lane and driver assist signal to the controller, and wherein the controller determines whether an unsafe driving condition exists based on the haptic lane and driver assist signal.

In other examples, the vehicle sensors comprise a wheel speed sensor that communicates a wheel speed signal to the controller, and wherein the controller determines whether an unsafe driving condition exists based on the wheels speed signal.

In other features, the vehicle sensors comprise a blind spot monitoring sensor that communicates a blind spot monitoring signal to the controller, and wherein the controller determines whether an unsafe driving condition exists based on the blind spot monitoring signal.

In additional features, the controller further determines whether an unsafe driving condition exists based on a driver ACC request enable signal and a driver request snow enable signal.

According to additional examples, a method for implementing a corrective action autonomous cruise control (ACC) system strategy is provided. The method includes: receiving, at a controller, at least signal from at least one vehicle sensor indicative of a driving condition; determining, at the controller, based on the signal, whether the at least one signal satisfies a threshold indicative of an unsafe driving condition; performing, at the controller, the corrective action strategy based on the determination that at least one signal satisfies an unsafe driving condition. The corrective action strategy comprises at least one of: (i) increasing a preset distance to a target vehicle; (ii) communicating a message to a human machine interface (HMI) in the vehicle indicative of an unsafe driving condition; (iii) communicating a signal to vehicle brakes of the vehicle to initiate a braking event; and (iv) communicating a signal to a traction control system to alter an acceleration setting.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As identified above, most ACC systems work on the assumption that normal driving conditions exist. However, not all driving conditions are ideal. As such, operating an ACC system assuming the driving conditions are different than they actually are can be undesirable. In most instances, prior ACC systems exit cruise control when poor driving conditions exist leaving the driver to control the vehicle.

The present disclosure provides an ACC system that can adjust vehicle controls based on driving conditions. In particular, the ACC system can adjust vehicle controls upon a determination that one of a low traction or a low visibility condition exists. In examples, the ACC system can increase the distance to a target vehicle to allow for increased distance to stop the vehicle. In additional examples, the ACC system can communicate a message (such as at a human machine interface (HMI)) to the driver indicative of a low traction and or low visibility condition is imminent. In other examples, the ACC system can communicate a signal to the vehicle brakes to initiate braking earlier and softer to avoid intervention of an anti-lock braking system that would otherwise cancel cruise control and hand off the situation to the driver to control. In additional examples, the traction control can accelerate to set speed slower than it normally would on dry road conditions. By operating the traction control at a more appropriate intervention, suspension harshness and potential damage to the suspension can be mitigated.

Figure 1:
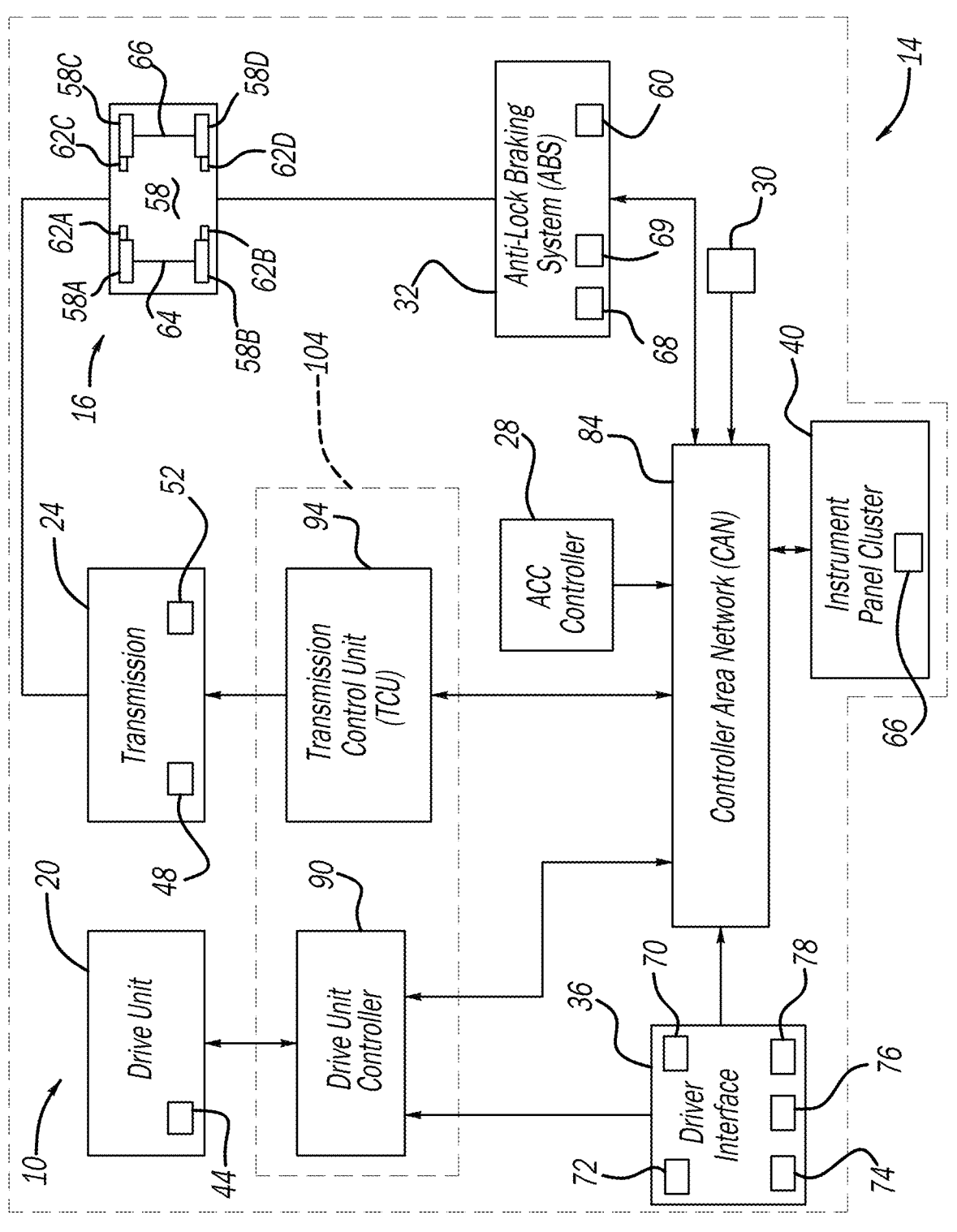
FIG. 1 is a schematic block diagram of an exemplary vehicle incorporating an ACC system according to the principles of the present disclosure.

With continuing reference to FIG. 1, an exemplary autonomous cruise control (ACC) system constructed in accordance to one example of the present disclosure is shown and generally identified at reference numeral 10. The ACC system 10 is associated with an exemplary vehicle 14 that delivers drive torque to a driveline 16 for propulsion. The ACC system 10 generally includes an ACC module or controller 28 that controls various vehicle components based on vehicle driving conditions received by sensors 30.

The exemplary vehicle 14 includes a drive unit 20, a transmission 24, an anti-lock brake system (ABS) 32, a driver interface 36 and a human machine interface (HMI) or instrument panel cluster 40. The drive unit 20 can be a conventional internal combustion engine (ICE), an electric motor, or combinations thereof. The drive unit 20 includes a speed sensor 44. The transmission 24 includes various transmission speed sensors, such as input and output transmission shaft speed sensors 48 and various clutch engagement sensors 52, such as pressure sensors, to provide a signal to an associated control system indicative of engagement of an associated clutch. The transmission 24 and ABS 32 are coupled or selectively coupled, directly or indirectly, to one or more wheels, collectively identified at 58 of vehicle 14, as is known in the art. Some or all of the wheels 58 can be drive wheels that receive torque input. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. The ABS 32 can additionally include or be configured to cooperate with a traction control system 68 and an electronic stability control system 69.

In the exemplary implementation illustrated, the ABS 32 is controlled to activate foundation brakes 60. The ABS 32 cooperates with the wheel speed sensors 62. The instrument panel cluster 40 includes various indicators, such as a low traction/low visibility light or indicator 66. The driver interface 36 includes a steering wheel 70 and a brake pedal 72. The driver interface 36 includes a driver input device, e.g., an accelerator pedal 74, for providing a driver input, e.g., a torque request, for drive unit 20. The driver interface 36 further includes an ACC settings input 76 where the driver can adjust various sensitivities of the ACC system 10. The driver interface 36 or vehicle interior also includes a transmission shift request device, such as a shift lever or rotary shifter 78, for the driver to request a desired transmission 24 gear.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes a drive unit controller 90 for controlling the drive unit 20, and a transmission control unit (TCU) 94 for controlling the transmission 24. Both of the control units 90 and 94 as well as the ABS 32, driver interface 36, instrument cluster 40 and sensor 30 are in communication with CAN 84 and thus each other. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle 14 being controlled by one controller.

Figure 2:
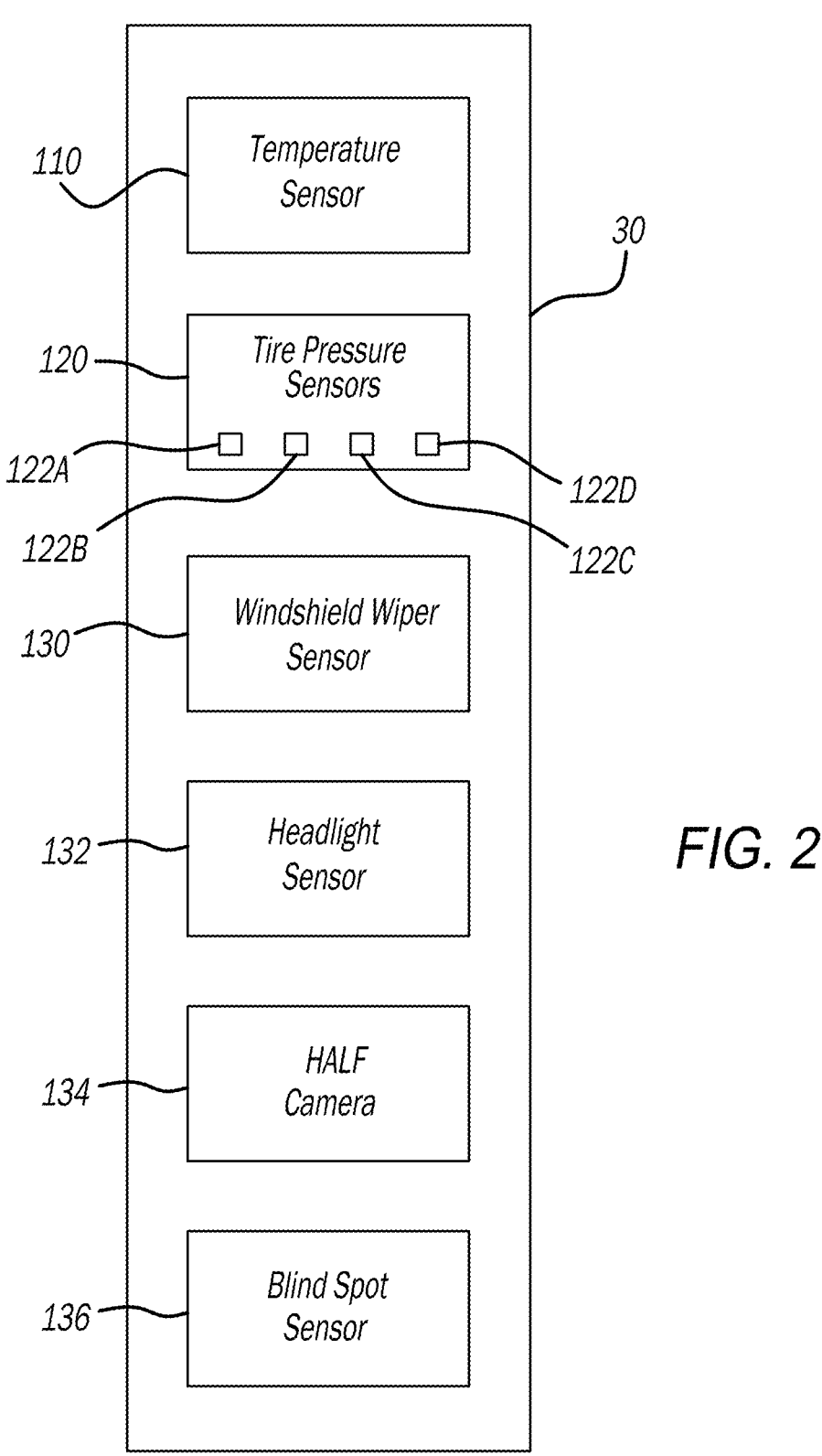
FIG. 2 are example sensors that cooperate with the ACC system of FIG. 1.

Referring now to FIG. 2 and with reference back to FIG. 1, additional features of the sensors 30 will be described. The sensors 30 can include a temperature sensor 110, a tire pressure sensor 120, a windshield wiper sensor 130, a headlight sensor 132, a HALF camera 134, and a blind spot sensor 136. The temperature sensor 110 senses ambient temperature and communicates a signal to the ACC controller 28. The tire pressure sensor 120 communicates tire pressures to the ACC controller 28 and includes tire pressure sensors 122A, 122B, 122C and 122D associated with the respective wheels 58A, 58B, 58C, 58D. The headlight sensor 132 communicates a high beam status to the ACC controller 28. The HALF camera 134 is a forward facing camera that senses vehicle surroundings and communicates signals to the ACC controller 28 indicative thereof.

The ACC system 10 creates a larger safety margin and helps keep the ACC engaged during low traction or low visibility conditions. The ACC system 10 provides additional comfort in such poor conditions. Traction information can be determined using various inputs such as, but not limited to, the ABS system 32, a traction control system and an electronic stability control system. When any of these systems intervene the ACC controller 28 can determine that low traction conditions exist. Additionally or alternatively, the ACC system can use inputs from the HALF camera 134, to detect lane marker lines while driving. If these lane lines are snow covered or otherwise unviewable by the HALF camera 134, it will cause the lane line to be undetectable. The lane keep assist will turn off during these blind times indicating a potential snow covered road condition. In addition, the forward-facing camera can be blinded by direct sunlight and other conditions which like a driver make forward visibility a challenge. As also discussed herein, other inputs such as ambient temperature, rain sensing devices, windshield wiper speed can also be good indicators that driving conditions are less than ideal.

Figure 3:
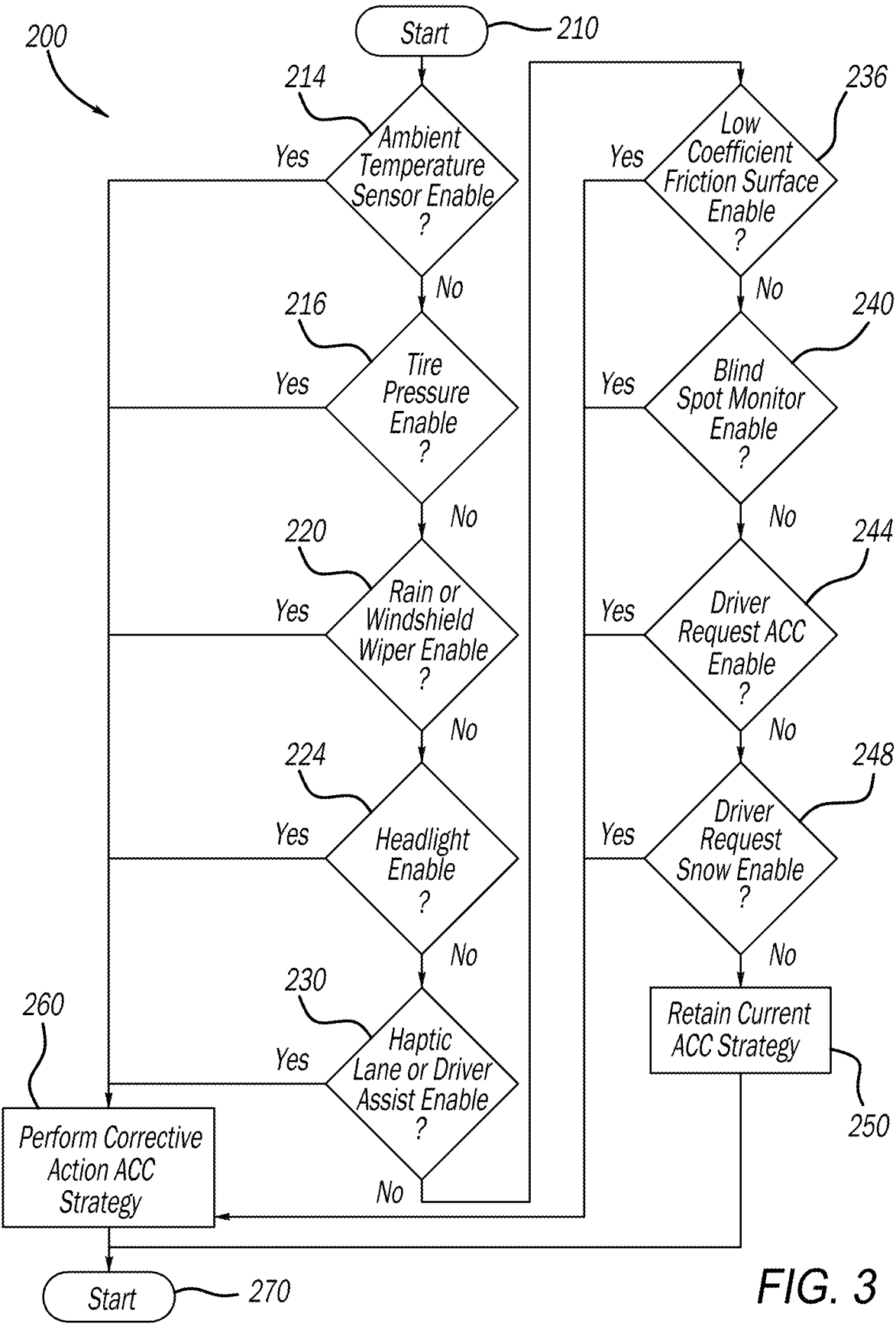
FIG. 3 illustrates an exemplary flow diagram for implementing the ACC system in accordance with the principles of the present disclosure.

Turning now to FIG. 3, an example functional block diagram or method of operating the ACC system 10 is shown and generally identified at reference numeral 200. The method begins at 210. At 214 control determines whether an ambient temperature sensor signal from the temperature sensor 110 satisfies an enable condition. In examples, control can compare the temperature signal received to a threshold temperature preset that is indicative of possible cold weather and poor driving conditions such as, but not limited to below freezing temperature. If yes, control proceeds to 260 where corrective action ACC strategy is performed.

As identified above, the corrective action ACC strategy 260 can include at least one action such as (i) increasing the distance to a target vehicle to allow for increased distance to stop the vehicle. In additional examples, the corrective action ACC strategy 260 can (ii) communicate a message 66 (such as at the instrument panel cluster 66) to the driver indicative of a low traction and or low visibility condition is imminent. In other examples, the corrective action ACC strategy can (iii) communicate a signal to the vehicle brakes 60 to initiate braking earlier and softer to avoid intervention of an anti-lock braking system 32 that would otherwise cancel cruise control and hand off the situation to the driver to control. In additional examples, the corrective action ACC strategy can (iv) use the traction control 68 can accelerate to set speed slower than it normally would on dry road conditions.

At 216 control determines whether a tire pressure sensor signal from the tire pressure sensors 58A-58D satisfies an enable condition. In examples, control can compare the tire pressure signals received to a threshold tire pressure preset that is indicative of an unsafe tire pressure and/or possible cold weather and poor driving conditions such as, but not limited to below freezing temperature. If yes, control proceeds to 260 where corrective action ACC strategy is performed.

At 220 control determines whether a rain or windshield wiper enable signal from the windshield wiper sensor 130 satisfies an enable condition. In examples, control can compare the windshield wiper sensor signal received to a preset that is indicative of possible poor visibility driving conditions. If yes, control proceeds to 260 where corrective action ACC strategy is performed.

At 224 control determines whether a headlight sensor signal from the headlight sensor 132 satisfies an enable condition. In examples, control can compare the headlight sensor signal received to a threshold preset that is indicative of possible poor driving conditions. For example, the headlights being in a bright mode can be indicative of poor driving conditions and/or poor visibility. If yes, control proceeds to 260 where corrective action ACC strategy is performed.

At 230 control determines whether a haptic lane or driver assist is enabled. In examples, the haptic lane or driver assist can be enabled such as at the instrument panel cluster 66. If yes, control proceeds to 260 where corrective action ACC strategy is performed.

At 236 control determines whether a low coefficient friction surface satisfies an enable condition. In examples, control can compare wheel speed sensor signals 62A-62D received to determine that one or more wheels are rotating at different speeds than other wheels which may be indicative of possible cold weather and poor driving conditions (ice, etc.) such as, but not limited to below freezing temperature. If yes, control proceeds to 260 where corrective action ACC strategy is performed.

At 240 control determines whether a blind spot sensor signal from a blind spot sensor 136 satisfies an enable condition. If yes, control proceeds to 260 where corrective action ACC strategy is performed.

At 244 control determines whether the driver has requested the ACC system 10 to be enabled. The ACC system 10 can be enabled such as at the instrument panel cluster 66. If yes, control proceeds to 260 where corrective action ACC strategy is performed.

At 248 control determines whether the driver has requested snow enable condition. The snow enable condition can be enabled such as at the instrument panel cluster 66. If yes, control proceeds to 260 where corrective action ACC strategy is performed.

If none of the above conditions exist, the ACC retains the current ACC strategy. It will be appreciated that while the above description has required only one condition to proceed to the corrective action ACC strategy 260, that in some examples, the ACC system 10 can be configured to meet more than one condition (for example at least two, at least three, at least four, etc.) to enter the corrective action ACC strategy.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An autonomous cruise control (ACC) system that implements a corrective action strategy based on one of low traction and low visibility driving conditions for a vehicle, the ACC system comprising:

a drive unit that provides drive torque to at least one wheel of the vehicle wheels for propelling the vehicle;

vehicle sensors that sense vehicle driving conditions;

vehicle brakes that actuate at a first time and a first intensity to slow the vehicle down during a braking event;

an anti-lock braking system that intervenes with vehicle brake actuation upon detection of an imminent brake locking condition; and a controller that implements the corrective action strategy, wherein the controller:

receives at least one signal from at least one vehicle sensor indicative of a driving condition;

determines, based on the at least one signal, whether the at least one signal satisfies a threshold indicative of an unsafe driving condition consistent with one of low traction and low visibility driving conditions; and performs the corrective action strategy based on the determination that at least one signal satisfies an unsafe driving condition, wherein the corrective action strategy comprises:

(i) increasing a preset distance to a target vehicle;

(ii) communicating a message to a human machine interface (HMI) in the vehicle indicative of an unsafe driving condition;

(iii) communicating a signal to the vehicle brakes of the vehicle to initiate the braking event; and (iv) communicating a signal to a traction control system to alter an acceleration setting;

wherein the vehicle brakes, in response to the communicated signal from the controller, are initiated at a second time, the second time being earlier than the first time and a second intensity, the second intensity being reduced compared to the first intensity, to slow the vehicle down and avoid intervention of the anti-lock braking system.

2. The ACC system of claim 1, wherein the vehicle sensors comprise:

an ambient temperature sensor that communicates a temperature signal to the controller, and wherein the controller determines whether an unsafe driving condition exists based on comparing the temperature signal to a threshold temperature.

3. The ACC system of claim 1, wherein the vehicle sensors comprise:

a tire pressure sensor that communicates a tire pressure signal to the controller, and wherein the controller determines whether an unsafe driving condition exists based on comparing the tire pressure signal to a threshold tire pressure.

4. The ACC system of claim 1, wherein the vehicle sensors comprise:

a windshield wiper sensor that communicates a windshield wiper signal to the controller, and wherein the controller determines whether an unsafe driving condition exists based on the windshield wiper signal.

5. The ACC system of claim 1, wherein the vehicle sensors comprise:

a headlight sensor that communicates a headlight sensor signal to the controller, and wherein the controller determines whether an unsafe driving condition exists based on the headlight sensor signal.

6. The ACC system of claim 1, wherein the vehicle sensors comprise:

one of a haptic lane and driver assist sensor that communicates a haptic lane and driver assist signal to the controller, and wherein the controller determines whether an unsafe driving condition exists based on the haptic lane and driver assist signal.

7. The ACC system of claim 1, wherein the vehicle sensors comprise:

8 a wheel speed sensor that communicates a wheel speed signal to the controller, and wherein the controller determines whether an unsafe driving condition exists based on the wheels speed signal.

8. The ACC system of claim 1, wherein the vehicle sensors comprise:

a blind spot monitoring sensor that communicates a blind spot monitoring signal to the controller, and wherein the controller determines whether an unsafe driving condition exists based on the blind spot monitoring signal.

9. The ACC system of claim 1, wherein the controller further determines whether an unsafe driving condition exists based on a driver ACC request enable signal and a driver request snow enable signal.

10. A method for implementing a corrective action autonomous cruise control (ACC) system strategy for a vehicle based on one of low traction and low visibility driving conditions for a vehicle, the vehicle having vehicle brakes that actuate at a first time and a first intensity to slow the vehicle down during a braking event, and an anti-lock braking system that intervenes with vehicle brake actuation upon detection of an imminent brake locking condition, the method comprising:

receiving, at a controller, at least signal from at least one vehicle sensor indicative of a driving condition;

determining, at the controller, based on the signal, whether the at least one signal satisfies a threshold indicative of an unsafe driving condition consistent with one of low traction and low visibility;

performing, at the controller, the corrective action strategy based on the determination that at least one signal satisfies an unsafe driving condition, wherein the corrective action strategy comprises:

(i) increasing a preset distance to a target vehicle;

(ii) communicating a message to a human machine interface (HMI) in the vehicle indicative of an unsafe driving condition;

(iii) communicating a signal to the vehicle brakes of the vehicle to initiate a braking event; and (iv) communicating a signal to a traction control system to alter an acceleration setting;

initiating actuation of the vehicle brakes, in response to the communicated signal from the controller, at a second time, the second time being earlier than the first time and a second intensity, the second intensity being reduced compared to the first intensity, to slow the vehicle down and avoid intervention of the anti-lock braking system.

11. The method of claim 10 wherein the vehicle sensors comprise:

an ambient temperature sensor that communicates a temperature signal to the controller, and wherein the controller determines whether an unsafe driving condition exists based on comparing the temperature signal to a threshold temperature.

12. The method of claim 10, wherein the vehicle sensors comprise:

a tire pressure sensor that communicates a tire pressure signal to the controller, and wherein the controller determines whether an unsafe driving condition exists based on comparing the tire pressure signal to a threshold tire pressure.

13. The method of claim 10, wherein the vehicle sensors comprise:

a windshield wiper sensor that communicates a windshield wiper signal to the controller, and wherein the controller determines whether an unsafe driving condition exists based on the windshield wiper signal.

14. The method of claim 10, wherein the vehicle sensors comprise:

a headlight sensor that communicates a headlight sensor signal to the controller, and wherein the controller determines whether an unsafe driving condition exists based on the headlight sensor signal.

15. The method of claim 10, wherein the vehicle sensors comprise:

one of a haptic lane and driver assist sensor that communicates a haptic lane and driver assist signal to the controller, and wherein the controller determines whether an unsafe driving condition exists based on the haptic lane and driver assist signal.

16. The method of claim 10, wherein the vehicle sensors comprise:

a wheel speed sensor that communicates a wheel speed signal to the controller, and wherein the controller determines whether an unsafe driving condition exists based on the wheels speed signal.

17. The method of claim 10, wherein the vehicle sensors comprise:

a blind spot monitoring sensor that communicates a blind spot monitoring signal to the controller, and wherein the controller determines whether an unsafe driving condition exists based on the blind spot monitoring signal.

18. The method of claim 10, wherein the controller further determines whether an unsafe driving condition exists based on a driver ACC request enable signal and a driver request snow enable signal.

\* \* \* \* \*